United States Patent [19]

Gueguin

[11] 4,078,039

[45] Mar. 7, 1978

[54] CHLORINATION OF TITANIUM SLAGS

[75] Inventor: Michel Gueguin, Tracy, Canada

[73] Assignee: Quebec Iron and Titanium Corporation - Fer et Titane du Quebec, Inc., Sorel, Canada

[21] Appl. No.: 768,826

[22] Filed: Feb. 15, 1977

Related U.S. Application Data

[63] Continuation of Ser. No. 616,249, Sep. 24, 1975, abandoned.

[51] Int. Cl.$^2$ ............................................. C01G 23/02
[52] U.S. Cl. ........................................ 423/74; 423/79; 423/116; 423/136; 423/149; 423/463
[58] Field of Search .................. 75/24, 26; 423/74, 76, 423/79, 149, 462, 463, 493, 498, 116, 136

[56] References Cited

U.S. PATENT DOCUMENTS

| | | | |
|---|---|---|---|
| 2,747,987 | 5/1956 | Daubenspeck | 423/79 |
| 2,868,622 | 1/1959 | Bennet et al. | 423/79 |
| 2,883,265 | 4/1959 | Evans | 423/79 |
| 3,425,797 | 2/1969 | Dewing | 423/493 |
| 3,929,975 | 12/1975 | King et al. | 423/463 |

Primary Examiner—O. R. Vertiz
Assistant Examiner—Brian E. Hearn

[57] ABSTRACT

Recovery of titanium as a titanium tetrachloride from slags produced from electrosmelting of relatively low content titanium bearing materials such as ilmenites.

5 Claims, No Drawings

CHLORINATION OF TITANIUM SLAGS

This is a continuation of application Ser. No. 616,249, filed Sept. 24, 1975, and now abandoned.

The present invention relates to a fluid bed chlorination of taniferous materials and especially slags to produce titanium tetrachloride, a starting material for the production of titanium pigment and titanium metal; more particularly, this invention relates to the maintaining in a feed to the fluid bed reactor certain impurities in a specified ratio as well as conducting the process with certain process relationships and variables maintained for more efficient obtention of the final titanium tetrachloride product.

BACKGROUND OF THE INVENTION

Slags produced from electrosmelting of relatively low titanium bearing materials, essentially ilmenites, whereby iron is recovered are, in their own right, upgraded $TiO_2$ materials generally suitable for production of $TiO_2$ pigment by so-called sulfate process. However, the upgrading of ores through the electrosmelting process is made at the expense of iron and the ratio with respect to $TiO_2$ to the other elements present in the ore such as Al, Si, Mg, Ca, Mn, V, Cr, etc. remain almost the same as in the starting ore.

In the chlorination of the slag, certain elements have essentially only an adverse economical impact due to a higher chlorine consumption per unit of $TiO_2$ while some impurities cause technical problems (besides the economical aspect). The major source of trouble is due to the accumulation in the charge or feed of high-boiling point chlorides. These chlorides are in the liquid state during the fluidized chlorination reaction and are causing an agglomeration of particles resulting in poor chlorine utilization. Agglomeration finally leads to the defluidization of the bed. The alkali, alkali earth and manganese impurities in the feed are especially undesirable as impurities found in the feed.

While ilmenites rarely contain alkali compounds, many ilmenites contain significant amounts of MgO, CaO and MnO which are the major offenders affecting the reactions in the fluid bed during chlorination. The above mentioned oxides tend to concentrate in the slag during the iron recovery in the electrosmelting process, making the resulting titanous slag concentrate generally unsuitable for chlorination purpose regardless of the $TiO_2$ grade.

ILLUSTRATIVE PRIOR ART

The prior art processes which illustrate the background of the problem, but have not suggested or made obvious solutions therefor, are found in U.S. Pat. Nos. 2,701,180 and 2,784,058; however, to achieve the same results as now discovered substantially greater number of steps with complicated process considerations are involved.

Another prior art process is illustrated in U.S. Pat. No. 2,784,058 in which a method is disclosed for removing the impurities by more complicated procedures and greater penalties when compared to the present process. Other processes are disclosed in British Pat. Nos. 702,109 and 921,531.

In general, in the above processes it is sought to increase the temperature for volatilization of impurities found in the ore. Despite the increase of temperature, a still low order of impurity separation is achieved.

BRIEF DESCRIPTION OF PRESENT INVENTION

It has now been found that the compositions of feed slag, if adjusted to match given ores in order to avoid agglomeration or fluid bed sticking, allows the operation of the chlorinator at normal operating temperatures (900°–1100° C).

The discovery is based on the fact that ferric and aluminum chlorides form double salts with chlorides of mono and bivalent elements of the M (I), $M(III)Cl_4$, or M(II), $M_2(III)\,Cl_8$ type, (where M is a metal and where the Roman numeral indicates its valence), and that these double chloride salts may exist in the gaseous phase; their partial vapor pressure at a given temperature range between those of the two constituent chloride salts.

Thus, according to the present invention, it has been found that titanium slag can be chlorinated in a fluidized bed reactor at temperatures ranging from 900° C to 1050° C provided a suitable composition of slags are maintained in the feed. A simple theoretical molecular relationship has to be respected, accordingly:

$$Fe / M \text{ or } Al/M \text{ or } Fe + Al/M = 2 \qquad (I)$$

(where M is a divalent metal). Typically, M is e.g. Mn, Mg, or Ca.

When silica is present in the feed phase, the alumina forms glassy silico-aluminates which are more difficult to chlorinate than the titanate phase. Consequently, part of the $Al_2O_3$ content is carried out of the bed as silicate dust. The amount of non-chlorinated alumina is about 40% while the Fe content is practically 100% chlorinated.

The following corrected formula should then be respected:

$$Fe + 0.6\,Al / (Ca + Mg + Mn) = (2K + 2Na + \text{etc.}) = 2 \qquad (II)$$

However, it has been found that 20% excess of trivalent bound chlorides on stoichiometric basis with respect to the above formula II is necessary to obtain an efficient distillation of undesired chlorides, as further shown in examples below.

It has been also found that if the trivalent element which binds the chloride is provided in separate grains such as non-contaminated ilmenite to balance the ratio of trivalent metal to divalent metal, the distillation of the undesirable chlorides is not much ameliorated due to poor contacts between the liquid chloride more or less trapped in the solid granules and the gaseous trivalent chloride. Only in-situ reaction is efficient. The following non-limiting examples illustrate the practice of the invention.

EXAMPLE 1

To an externally heated 2 inches I. D. 5 ft. long Vycor tube with a porous plate sealed in the middle as gas distributor was added 100 g. of petroleum coke (−48+100 mesh) and 200 g. of slag (−65+250 mesh) with a composition as shown in Table 1.

Table 1

| Slag Composition - % | | | | | | | | |
|---|---|---|---|---|---|---|---|---|
| $TiO_2$ | *$Fe_T$ | $SiO_2$ | $Al_2O_3$ | $Cr_2O_3$ | $V_2O_5$ | MnO | CaO | MgO |
| 71.0 | 10.0 | 5.2 | 5.5 | 0.2 | 0.6 | 0.8 | 0.8 | 5.1 |

*$Fe_T$ is primarily = 92% FeO, 8% Fe metal.

The mixture was fluidized with an argon flow at a superficial velocity of 0.6 ft/sec. At 990° C argon was progressively replaced with chlorine. When pure chlorine was blown, the bed became very viscous and was quickly defluidized. Fluidization was progressively restored a few minutes after argon replaced chlorine. After 20 minutes 66.6 g. of slag and 11.0 g. of coke were added every 8 minutes, the test was finally stopped due to defluidization of the bed.

After cooling, the charge was a monolithic block which became pasty when contacted with atmospheric humidity.

the bed composition was as follows:

| Oxides | L.O.I. | Solubles |
|---|---|---|
| 42.1% | 46.6% | 11.3% |

Oxides = $TiO_2$ 52.3; $Fe_T$ 0.68; $SiO_2$ 23.22; $Al_2O_3$ 14.79; $Cr_2O_3$ 0.21; $V_2O_5$ 0.18; MnO 0.05; CaO 0.69; MgO 7.46.
L.O.I. primarily = Carbon
Solubles primarily = $CaCl_2$ 26.2; $MgCl_2$ 60.5; $FeCl_2$ 13.2.

EXAMPLE 2

To an externally heated Vycor tube of 2 inches I.D. was added 100 g. of petroleum coke (−28+48 mesh) and 200 g. of a slag (−48+150 mesh) of the following composition:

| $TiO_2$ | $Fe_T$* | $SiO_2$ | $Al_2O_3$ | $Cr_2O_3$ | $V_2O_5$ | MnO | CaO | MgO |
|---|---|---|---|---|---|---|---|---|
| 96.3 | 2.0 | Traces | 2.46 | 0.04 | 0.36 | 0.95 | 0.36 | 0.92 |

*$Fe_T$ is essentially FeO, it is defined in Table 1.

The mixture was fluidized with a nitrogen flow at a superficial velocity of 0.6 ft/sec. When the temperature reached 985° C, the gas flow was switched progressively from nitrogen to chlorine at the same velocity. A total volume of 485 l of chlorine was passed through the solid bed which was fed with fresh material every 8 minutes as follows:

66.6 g. of slag + 12.6 g. of petroleum coke for a total of 712.8 g. of slag + 135 g of coke before an over-pressure due to chloride condensation at the top of the reactor blocked the feeding system. The fresh material added was equivalent to 3.5 bed changes.

After cooling, the apparatus was dismantled, and the various residues collected and analyzed.

The bed was free flowing and had the following composition:

| Oxides | L.O.I. | Solubles |
|---|---|---|
| 59.8% | 37.8% | 2.4% |

The ratio of Fe and Al with respect to M, the high boiling point chloride elements (Mn + Mg + Ca) in the residues and the percentage of generated high-boiling point chlorides distilled were as follows:

| Atomic Ratio | | | | % Chlorides Distilled | | |
|---|---|---|---|---|---|---|
| in slag | | in distillate | | | | |
| Fe/M | Fe + Al/M | Fe/M | Fe + Al/M | Mn | Mg | Ca |
| 0.82 | 1.87 | 0.97 | 2.17 | >99 | 86.2 | 63.0 |

EXAMPLE 3

To an externally heated Vycor tube of 2 inches I. D. was added 100 g. of petroleum coke (−28+48 mesh) 176.0 g. of slag (−48+150 mesh) of the same composition as in Example 2 and 24.0 of ilmenite of the following chemical composition:

| $TiO_2$ | $Fe_T$ | $SiO_2$ | $Al_2O_3$ | $Cr_2O_3$ | $V_2O_5$ | MnO | CaO | MgO |
|---|---|---|---|---|---|---|---|---|
| 63.8 | 21.1 | 0.67 | 1.40 | 0.07 | 0.17 | 0.95 | 0.04 | 0.36 |

The run was carried out as in Example 2 except that the addition of fresh material every 8 minutes was: 58.0 g. of slag + 7.8 g. of ilmenite and 14.0 g. of petroleum coke for a total of 754.0 g. of slag + 125.4 g. of ilmenite + 282.0 g. coke, i.e. 5.3 bed changes in 114 minutes.

After the end of the test the bed was free flowing and had the following composition:

| Oxides | L.O.I. | Solubles |
|---|---|---|
| 49% | 48.4% | 3.6% |

The atomic ratio of Fe and Fe + Al to M the high-boiling point chlorides elements (Mn + Mg + Ca) in the feed and residues as well as the percentage of the $MCl_2$ chlorides distilled were as follows:

| Atomic Ratio | | | | % Chlorides Distilled | | |
|---|---|---|---|---|---|---|
| in feed | | in distillate | | | | |
| Fe/M | Fe + Al/M | Fe/M | Fe + Al/M | Mn | Mg | Ca |
| 1.90 | 3.04 | 1.88 | 2.96 | 96.2 | 89.5 | 17.6 |

EXAMPLE 4

In this example an initial charge of 135.0 g. of petroleum coke (−28+48 mesh) and 270.0 g. of slag (−48+150 mesh) was introduced in the reactor fluidized with a flow of nitrogen at a superficial velocity of 0.6 ft/sec. which was progressively substituted by chlorine. The temperature was maintained to about 975°–1000° C during all the run. Every 4 minutes 35.5 of slag + 7.0 g. of coke was added to the bed for a total of 923.0 g. and 717.0 g. respectively or 2.36 bed change.

The slag used had the following composition:

| $TiO_2$ | $Fe_T$ | $SiO_2$ | $Al_2O_3$ | $Cr_2O_3$ | $V_2O_5$ | MnO | CaO | MgO |
|---|---|---|---|---|---|---|---|---|
| 89.6 | 5.2 | 1.82 | 1.83 | 0.36 | 0.45 | 1.77 | 0.07 | 1.03 |

The atomic ratio M(III)/M(II) and the distillation efficiency of high boiling point chlorides were as follows:

| Atomic Ratio | | | | % Chlorides Distilled | | |
|---|---|---|---|---|---|---|
| in slag | | in distillate | | | | |
| Fe/M | Fe + Al/M | Fe/M | Fe + Al/M | Mn | Mg | Ca |
| 1.63 | 2.36 | 1.97 | 2.44 | >99.5 | >99.5 | 73.0 |

EXAMPLE 5

The same as in example 5 but with 3.4 bed changes.
The atomic ratio in distillate and the divalent chlorides distillation efficiency were as follows:

| Fe/M | Fe + Al/M | Mn | Mg | Ca |
|------|-----------|------|------|------|
| 1.83 | 2.25 | >99.5 | >99.5 | 91.5 |

In practicing the process, the carbonaceous material used in the above examples may be petroleum coke. A particle size range from 20 mesh to 100 mesh has been found suitable when employing the above carbonaceous material.

With respect to the slag, a suitable particle size range has been found to be from 35 mesh to 150 mesh.

The ratio of carbonaceous material to the slag when fed into the fluidized bed reactor is from 1 : 5 to 1 : 6 on a weight basis.

Chlorine gas velocity in said bed is generally from 0.3 to 1.0 ft/sec. of superficial gas velocity.

The end product analysis for the end product such as for Example 5 end product is as follows:

Oxides: 72.7% ($TiO_2$ = 89.0; $Fe_T$ = 0.27; $SiO_2$ = 5.09; $Al_2O_3$ = 0.87; CaO = 0.24; MgO = 0.47; MnO = 0.23; $Cr_2O_3$ = 0.35; and $V_2O_5$ = 0.11).

Carbon: 26.6%.

Solubles: 0.4% ($CaCl_2$ = 90.8; $MgCl_2$ = 1.4; $MnCl_2$ = 1.4; $FeCl_2$ = 6.4).

As mentioned above, when in-situ in the slag particle intimately admixed impurities and trivalent compounds such as aluminum and iron are aiding the chlorination reaction; in order to have the desired ratio of aluminum and iron to the impurities in the slag, the slag is appropriately analyzed, adjusted. The slag is then ground to obtain the slag material in the desired particle size.

What is claimed is:

1. A process for recovery of titanium as titanium tetrachloride from slage produced from electrosmelting or smelting of relatively low content titanium bearing material in the presence of carbonaceous material comprising the steps of:

(a) maintaining a fluidized bed of particulates of said titanium slags of titanium bearing material including said carbonaceous material also as particulates, and further, iron, aluminum as constituent part of the particulates of titanium slag and titanium bearing material, and as impurities in the slage and titanium bearing material, silica, alumina, chromium oxides, vanadium oxides, manganese oxides, calcium oxide, magnesium oxide, and alakli metals;

(b) feeding said fluidized bed with said slags of titanium bearing material as particulates and, as a reactant therewith for a reaction taking place in-situ in said particulate, chlorine;

(c) monitoring and adjusting the content of impurities in said slags of titanium bearing materials in a ratio whereby each of Fe/M, Al/M, or Fe + 0.6 Al/M is equal to about 2, where M is a divalent metal and is an impurity and M is primarily manganese, magnesium, or calcium, said ratio being monitored in said particulates, and being adjusted in a feed particulate according to said ratios above for said Fe/M, Al/M or Fe + 0.6 Al/M content thereof so as to be equal to about 2 when feeding the particulate material into said fluidized bed;

(d) chlorinating said slag or titanium bearing material as particulates in said fluidized bed at 900° C to 1050° C while maintaining said bed in a fluidized condition, said chlorination taking place in-situ in said particulate;

(e) volatilizing said impurities from each of said particulates; and (f) recovering said titanium tetrachloride substantially free of said impurities.

2. The process as defined in claim 1, wherein said impurities are monitored, in presence of silica in a ratio of components whereby Fe + 0.6 Al/M is equal to about 2 and wherein M is as defined above and also may include alkali metal impurities, said ratio of said components being maintained when feeding appropriately adjusted slag as a particulate feed to said fluidized bed.

3. The process as defined in claim 1, wherein the impurities are volatilized by feeding Fe and Al in said feed particulates as constituent part of said particulates and wherein Fe and Al are in an excess of up to 20% according to said ratio.

4. The process as defined in claim 1, wherein Fe and Al are in an intimate admixture with said other impurities in a fluidized particulate from which the impurities are sought to be driven off during said chlorination reaction taking place in-situ in said particulate.

5. The process according to claim 1, wherein the metal M impurities are manganese oxide, calcium oxide and magnesium oxide, and these are substantially driven off during said chlorination reaction.

* * * * *